United States Patent
Van Stavern et al.

[15] 3,685,653
[45] Aug. 22, 1972

[54] METHOD FOR THE SEPARATION OF OIL AND WATER FROM AN EMULSION

[72] Inventors: Merle H. Van Stavern; Henry D. Moorer; Gordon H. Miller; Kenneth M. Gunn, all of Richmond, Va.

[73] Assignee: Texaco, Inc., New York, N.Y.

[22] Filed: June 25, 1971

[21] Appl. No.: 156,643

Related U.S. Application Data

[63] Continuation-in-part of Ser. Nos. 46,056, June 15, 1970, abandoned, and Ser. No. 46,057, June 15, 1970, Pat. No. 3,612,277.

[52] U.S. Cl.............210/83, 210/242, 210/DIG. 21
[51] Int. Cl. .........................................E02b 15/04
[58] Field of Search.........210/77, 402, DIG. 21, 242, 210/83

[56] References Cited

UNITED STATES PATENTS

| | | | |
|---|---|---|---|
| 1,379,176 | 5/1921 | Foster | 210/402 X |
| 1,860,819 | 5/1932 | Schamberger | 210/402 X |

*Primary Examiner*—J. L. DeCesare
*Attorney*—Thomas H. Whaley et al.

[57] ABSTRACT

Facilitating and expediting separation of oil/water emulsions by passing the emulsion as a surface film on a rotating pick-up roller into a bight formed by a closely spaced parallel rollers to coalesce the oil particles, break the emulsion and liberate free oil.

2 Claims, 5 Drawing Figures

METHOD FOR THE SEPARATION OF OIL AND WATER FROM AN EMULSION

This application is a continuation-in-part of U.S. Pat. application Ser. No. 46,056 filed June 15, 1970, now abandoned, which in turn was copending with patent application, Ser. No. 46,057 filed June 15, 1970 in the name of Merle H. Van Stavern, Wylie T. Jones and Howard F. Cossay, now U.S. Pat. No. 3,612,277, patented Oct. 12, 1971, concerns a method and apparatus for recovering oil slicks from marine surfaces at a reasonable rate of recovery with a limited pick-up of water with the oil.

The present invention relates to the separation of oil and water, and more particularly to the breaking of oil/water emulsions.

It has been the practice to separate various emulsions, if possible, by settling, centrifuging and the like or by the use of chemical means.

In general, however, even without problem emulsions, a significant period of time is required for separation. This is advantageous in connection with the disposal of the recovered oil by, for example, conducting it to a receiving tank, inasmuch as the oil capacity of the receiver is limited by the water. Therefore restriction of the water picked up with the oil makes possible more efficient use of the equipment.

Stated in another way, when oil is recovered by a roller which dips down into the layer of oil and carries it up to a doctor blade, the oil tends to be accompanied by a film of water. At higher rates of roller rotation and recovery there is usually greater water contamination. For this and other reasons apparent from the aforesaid application it may be beneficial to decrease the quantity of water which is recovered with the oil.

In accordance with the present invention we have discovered that the foregoing method and equipment used in the recovery and clean up of oil spills, appropriately adjusted, operates to break emulsions of oil and water.

Such emulsions are found in a vast number of industrial operations; for example, field emulsions from producing wells, or emulsions in circulating lubricating oil systems such as the oil system of a turbine or steam engine.

The present invention therefore contemplates means and steps for accelerating the breaking of an emulsion, an objective which is of particular significance with today's demand for clarification of increased quantities of water. This is accomplished by picking up on the surface of a rotating roll, a coating of emulsion which is then brought into contact with a supplemental or so-called transfer roll located above and out of contact with the body of emulsion. The transfer roll is spaced closely from the first named roll or pick up roll a critical distance in the range of 1 to 6 mils effective to cause the minute particles of dispersed oil to coalesce and segregate.

In order to illustrate a preferred form of our invention reference is made to the figures of the attached drawing wherein FIG. 1 is a perspective view of a fragmentary portion of a pick-up float or vessel constructed in accordance with the present invention;

Figure 1:
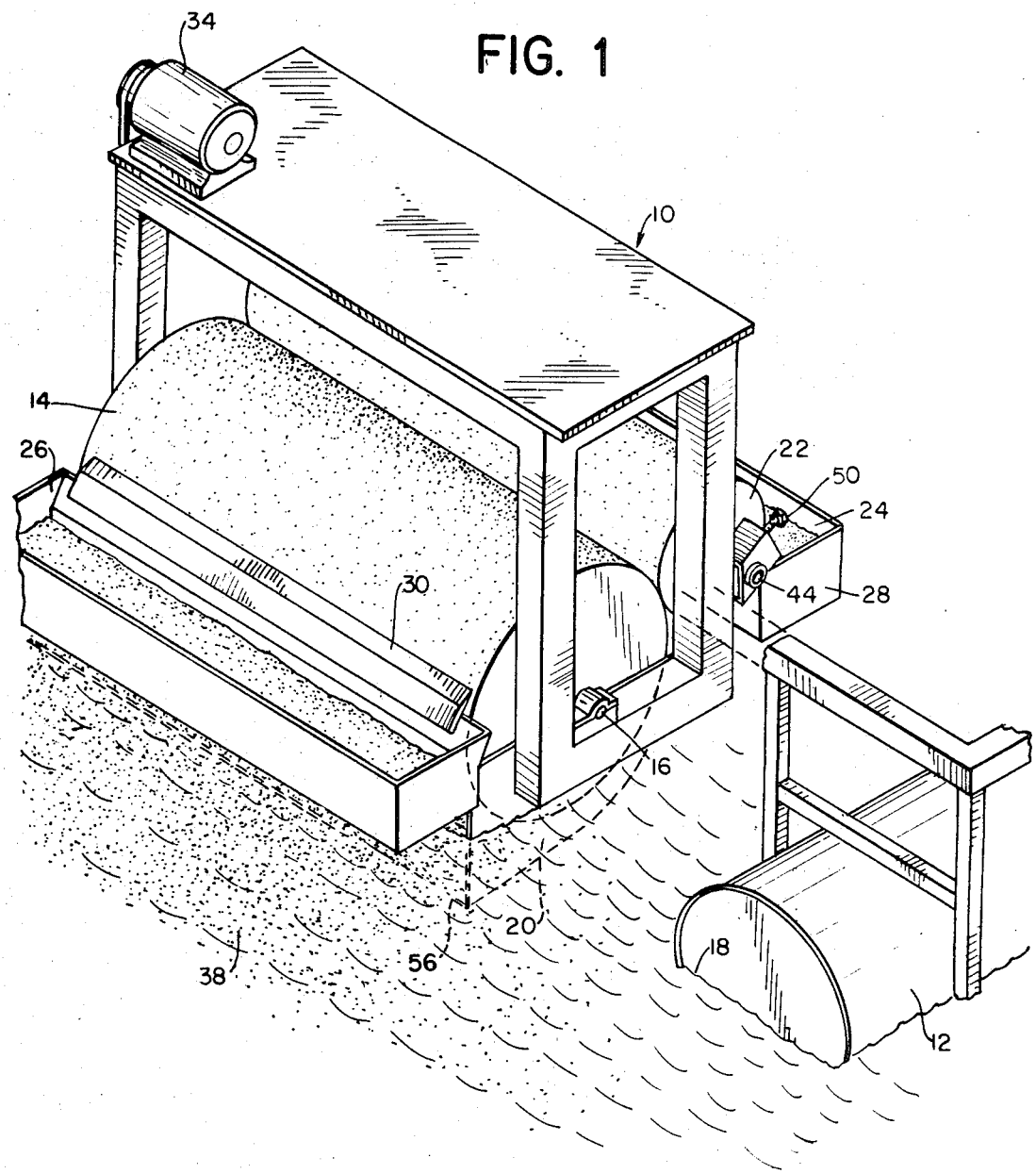

Referring now to the figures in the drawing, 10 represents the frame of the device which is carried by a pair of floats 12 which may take the form of any suitable marine vessel. Where it is desired to arrange the oil pick-up device over a fixed channel, the frame can be simply mounted on fixed supports over the channel.

A pick-up roller, comprising cylinder 14, is journaled as at 16 in frame 10. Roll 14 is so arranged that its lower extremity dips into the water surface 18 as at 20.

A supplemental or transfer roller comprises cylinder 22, likewise journaled at 24 on the frame 10 and located in a position substantially above and out of contact with the oil slick 38.

Figure 2:
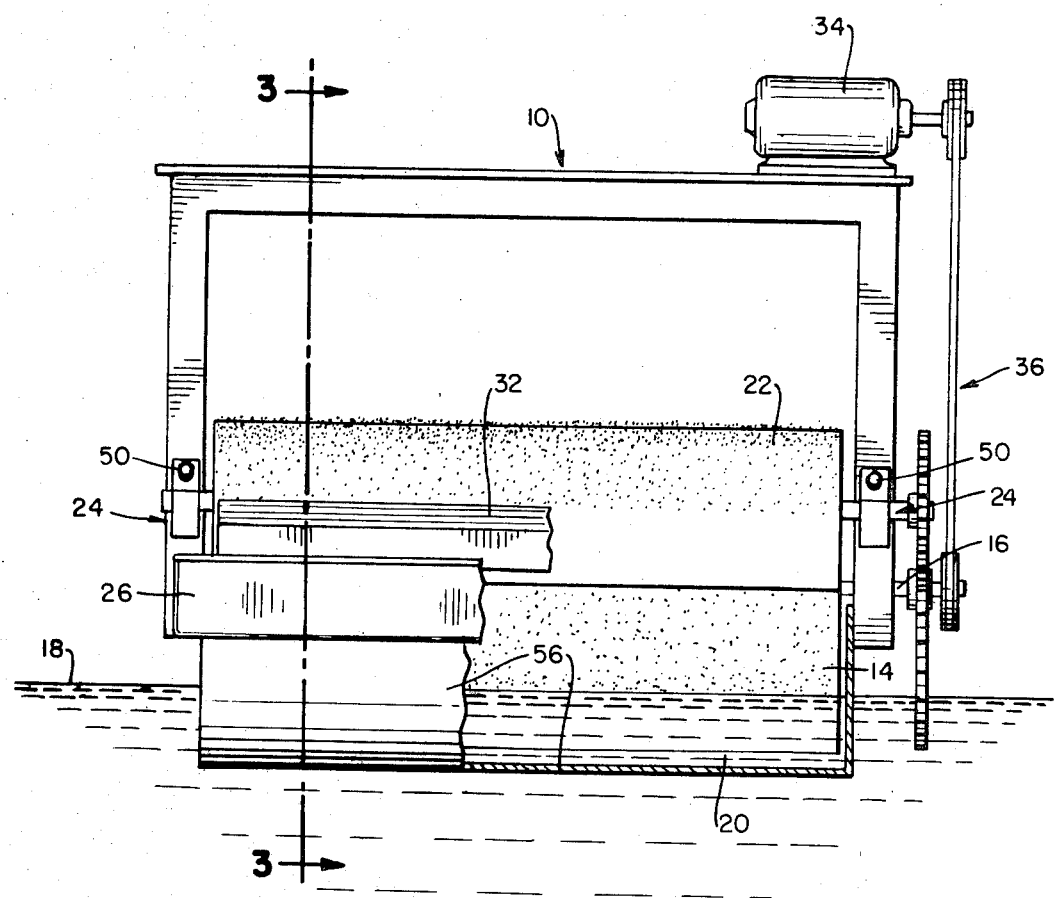
FIG. 2 is an elevation taken from the rear of the device of FIG. 1 with portions of the recovery trough and baffle broken away to show the underlying structure.

Pick-up troughs 26 and 28 are arranged respectively adjacent the pick-up roll 14 and transfer roll 22 to receive film removed byscrapers or doctor blades 30 and 32, which bear against the respective rollers. The rollers may be rotated in opposite rotational directions by drive motor 34 and suitable belt and gear drive 36, as shown more clearly in FIG. 2 so that the rollers move, at their point of close juxtaposition, at approximately the same speed and the same direction.

Figure 3:
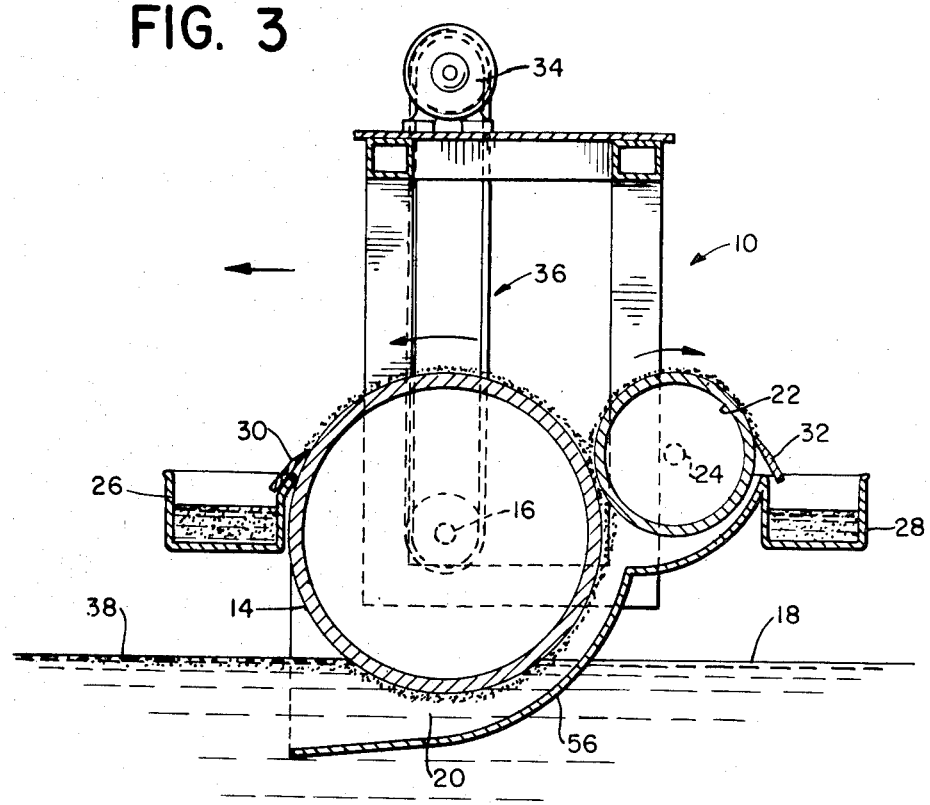
FIG. 3 is a sectional view taken on the line 3—3 of FIG. 2.

As indicated more clearly in the more or less diagrammatic FIG. 3, the roller 14 rotates in a counter clockwise direction. This is a good arrangement where the direction of movement of the vessel is toward the left as viewed in the figure or where a flow of oil is from the left. In this arrangement the rotating surface which has just passed the doctor blade first contacts oil layer 38 and carries the adherent oil downwardly and (if the oil layer is thin) through the water surface. Thereafter it emerges and proceeds up to the bight between rolls 14 and 22, at which point the surface of roll 22, rotating in the opposite angular direction, contacts the oil layer as shown.

Figure 4:
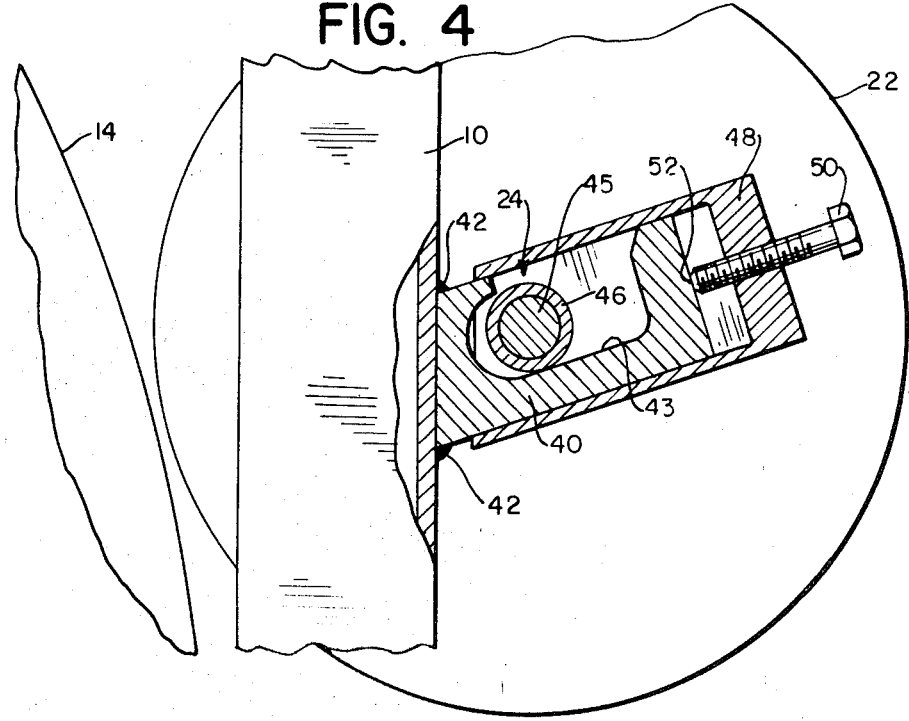
FIG. 4 is a detailed fragmentary view of an adjustable journal for the transfer roller.

Means are provided as shown more clearly in FIGS. 3 and 4 for adjusting the spacing between the parallel rollers 22 and 14, comprising a projecting journal support 40 welded to the frame 10 as at 42 and provided with a central recess 43 to accommodate shaft 44 and journal 46 of roller 22.

The shaft 44 of roller 22 and the journal 46 ride in an adjust box or sleeve 48 which is supported by the journal support 40. Adjustment of the box 48 inwardly or outwardly along support 40 causes roller 22 to move transversely toward or away from the pick-up roller 14 to adjust the spacing therebetween.

This adjustment is accomplished by machine bolt 50 which is threaded thru the box 48 and contacts the journal support 40 as at 52.

The roller spacing or gap is appropriately adjusted until the liquid squeezed out between the bight of the two rollers, as well as that recovered in the respective troughs 26 and 28 shows maximum separation of the emulsion.

In operation, roller 14 dips into an oil-water emulsion as indicated in FIG. 3, carrying a film thereof up into the bight between rollers 14 and 20.

It usually happens that oil emulsions are associated with separate streams of oil or water as, for example, a stream of oil-water emulsion floating on a stream of vapor-oil:water emulsion floating of water or/on a layer of oil, floating, in turn, on the water. In any event it is desirable to rotate the pick-up roll down into the emulsion layer and, if necessary, therebelow so as to continuously conduct a film of oil thru the rotational paths up into the bight between the rolls.

In general, emulsion breaking follows, as above indicated, a close setting of the two rolls, in the range of about 1–6 mils. The emulsion being conveyed into the bight between the two rolls is subjected to a squeeze or compression action. It has also been found that the total amount of liquid which is picked up by the transfer roll 22 decreases as the roll spacing is increased above about 2–3 mils. Therefore, it is advantageous to merge the two rolls and preferably considerably smaller than this, as for example, a spacing of 1–4 mils.

By way of exemplifying the present invention a series of tests were run using a laboratory scale piece of roller pick-up and transfer device identical in arrangement with that shown in the attached drawings, but modified to provide a relatively small trough, closely fitted under the pick-up or main roll so that the emulsion is continuously fed into contact with the roller until essentially all of the feed stream has been picked up.

One emulsion employed for the present tests comprises a 2 percent water emulsified in a continuous phase of Code 1562 Capella oil, wax free Grade D having the following properties:

| Appearance | Pale Yellow Blue Bloom |
|---|---|
| Gravity | 25.3 |
| Flash, COC | 400 |
| Fir, COC | 445 |
| Color, ASTM | L1.5 |
| Pour, °F. | −35 |
| Vis, SUS at 100°F. | 313 |
| 210°F. | 47.4 |
| VI(D-2270) | 18 |
| Freon Haze | −55 |
| Freon Flock | −70 |

The separation properties of the emulsion during quiescent holding show about 72 percent of the water settled out of the emulsion at 90 hours of standing time.

The data derived from the operation of the dual roller pick-up and transfer device were as follows, using rollers having a teflon surface rotated at 80 rpm in each instance:

| Roll Spacing | No. Cycles | Water Collected (cc) Charge Trough | Product Pan | Accumulated Total (cc) | percent of Water Removed |
|---|---|---|---|---|---|
| 2 mil. | 1 | 8.0 | 5.0 | 13.0 | 66.6 |
| 1–1.5 mil | 1 | 13.5 | 2.1 | 15.6 | 80.0 |
|  | 2 | 1.2 | 0.2 | 17.0 | 87.3 |

Apart from the significant effect of this treatment in expediting separation of the soft emulsion it is to be especially observed that we are here concerned with breaking the emulsion, rather than separating the streams. Stated in another way, the amount of product delivered to trough 26 and 28 is of no particular significance since the material which is discharged downwardly from between the bight of the rollers 14 and 22 is also de-emulsified product.

In other words, it is to be noted that the demulsification figures above represent not only product (both oil and water) recovery in troughs 26 and 28 but also the product which has been returned to the charge trough.

This has many beneficial possibilities. First, the troughs 26 and 28 may be omitted so that the entire product is continuously returned to the original reservoir. This may be particularly advantageous and economical in treating the contents of a large settlement basin or reservoir where the separated oil and water proceed to stratify below the upper layer of emulsion. In other words, the present equipment, arranged in a settling pond of this type, does not require any alteration of the system but simply accelerates the separation.

As a result, the treatment capacity of the pond is correspondingly increased.

While the applicants do not wish to be bound thereby, they nevertheless speculate that the constricting effect of drawing the emulsion into the narrow bight between the rollers tends to coalesce the particles of the dispersed phase into larger and more continuous masses, which, therefore, readily separate out.

Also indicated by the foregoing data is the fact that repetition of the treatment tends to result in yet further emulsion breaking. By way of explanation, reference in the data to No. Cycles concerns the number of times the treatment was conducted and the numeral 2 in this column in the third row of figures in the table signifies repetition or retreatment of the emulsion which remained unseparated after the previous treatment. This indicates that repeated treatment of the emulsion by the rollers effects yet further separation. This leads to the observation that continuous treatment of the emulsion in an open pond will ultimately effect a significant improvement in separation.

By way of further example, reference is made to a typical hard emulsion encountered in the product from the barometric condenser of vacuum pipe still in a typical petroleum refinery. Such units operate to effect a distillation of the oil under a vacuum, maintained by injection of steam into a barometric condenser. Some of the oil, carried over from the vacuum still into the condenser, becomes emulsified with the condensate.

Ordinarily oil is recovered from such condensate by returning it to the still, preferably after effecting a partial separation in a settling pond or the like. An extensive pond area may be required due to the relatively slow process of settlement, and the products also include a hard emulsion which does not separate and therefore requires the return of water back into the still, which yet further impairs operation thereof.

The tests were conducted on bench model, dual roller, pick up and transfer device shown in the previous figures with one exception, namely the omission of the doctor blade and pick-up trough on the main pick-up roll 14. This arrangement was selected to obviate variables caused by multiple recovery and to enable more consistent test operations.

In the experiments, roll speed was constant at 60 rpm. The roll surface was stainless steel.

Figure 5:
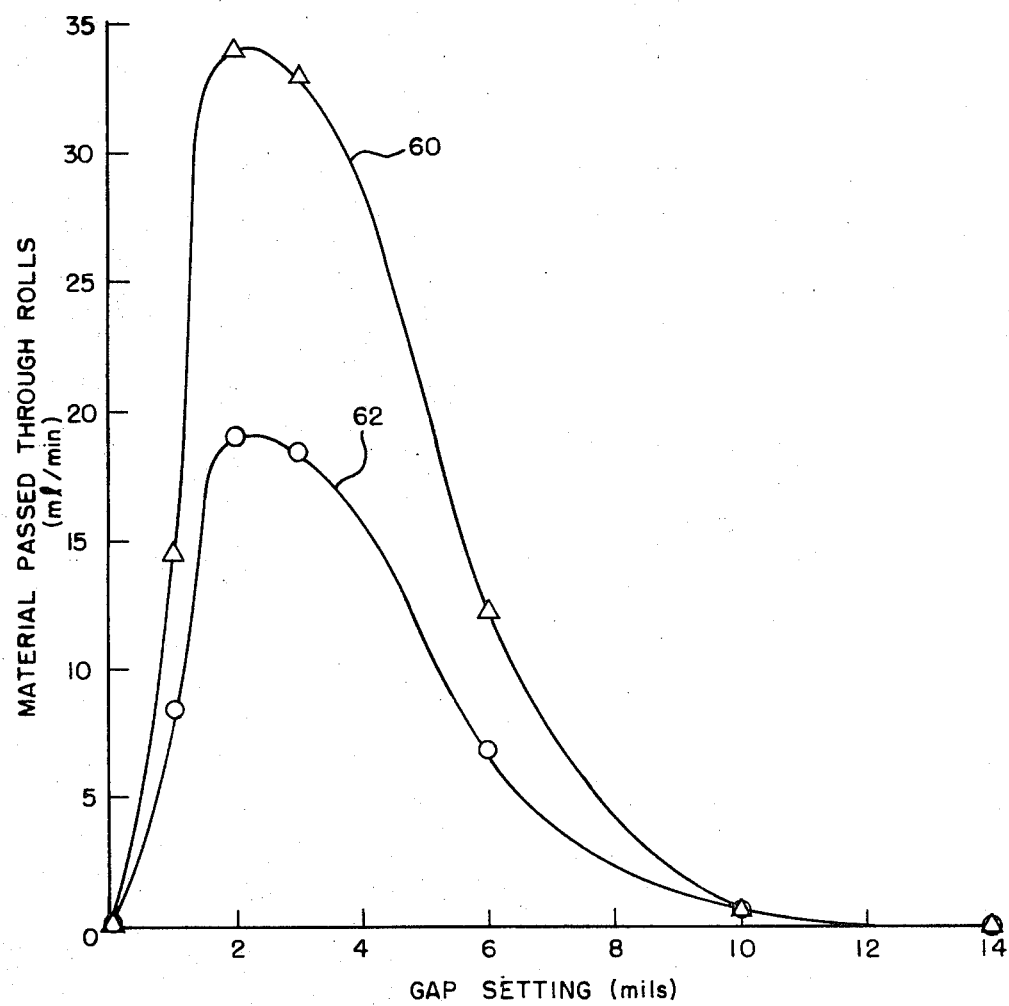
FIG. 5 is a typical performance carve showing the operations of the present system.

Referring to the FIG. 5, the vertical scale shows liquid material passing through the bight between the two rollers thereafter caught and recovered by the doctor blade 32 and pick-up trough 28 on the transfer roll 32—expressed milliliters per minute. The curve identified by numeral 60 represents the total liquid so recovered. While 62 represents the recovery of free oil.

The horizontal scale represents the roll spacing in mils, namely thousands of an inch.

The results therefore show a striking and unobvious breaking of a hard, resistant emulsion, which surprisingly reaches a maximum at the range between 1 and 6 mils.

A further phenomenon which seems not to have been previously observed is the fact that the transfer of liquid to the transfer roll at first increases with roll spacing and then decreases.

Surprisingly, moreover, there is greater transfer at an intermediate roll spacing of 2–3 mils than when the space between the rolls is wider.

We claim:
1. The method of facilitating the separation and breaking of an emulsion of oil and water into independent oil and water phases which comprises,
   forming a film of oil/water emulsion on the surface of a rotating pick-up roll,
   bringing said film of oil/water emulsion on said pick-up roll in contact with a second roll arrange in coaxial parallelism to the first roll with its adjacent surface rotating in approximately the same direction and the same speed as the first roll the adjacent surfaces of the rollers being disposed in spaced relationship to one another within a range of from about 1 to 6 mils at which the minute particles of oil of the emulsion coalesce together and segregate into free oil.
2. The method as called for in claim 1 wherein said roller spacing is within a range from about 1 to 4 mils.

* * * * *